US012060850B2

United States Patent
Gonidec et al.

(10) Patent No.: US 12,060,850 B2
(45) Date of Patent: Aug. 13, 2024

(54) DOOR FOR THRUST REVERSER OF AN AIRCRAFT PROPULSION ASSEMBLY, COMPRISING A FLEXIBLE BAFFLE

(71) Applicant: SAFRAN NACELLES, Gonfreville-l'Orcher (FR)

(72) Inventors: Patrick Gonidec, Moissy-Cramayel (FR); Gerard Clere, Moissy-Cramayel (FR); Alexandre Phi, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 2 days.

(21) Appl. No.: 17/610,580

(22) PCT Filed: May 5, 2020

(86) PCT No.: PCT/EP2020/062450
§ 371 (c)(1),
(2) Date: Nov. 11, 2021

(87) PCT Pub. No.: WO2020/229232
PCT Pub. Date: Nov. 19, 2020

(65) Prior Publication Data
US 2022/0316426 A1    Oct. 6, 2022

(30) Foreign Application Priority Data

May 14, 2019  (FR) ..................................... 19 05011

(51) Int. Cl.
*F02K 1/70*    (2006.01)
(52) U.S. Cl.
CPC .......... *F02K 1/70* (2013.01); *F05D 2300/601* (2013.01)

(58) Field of Classification Search
CPC ..................................... F02K 1/70; F02K 1/72
See application file for complete search history.

(56) References Cited

U.S. PATENT DOCUMENTS 3,330,115 A * 7/1967 Markowski ............... F02K 1/68
60/230
3,366,349 A * 1/1968 Rudis ........................ F02K 1/68
60/230

(Continued)

FOREIGN PATENT DOCUMENTS

| EP | 0 882 881 A1 | 12/1998 |
|---|---|---|
| FR | 2 618 853 A1 | 2/1989 |
| FR | 2 916 484 A1 | 11/2008 |

OTHER PUBLICATIONS

International Search Report issued on Aug. 3, 2020 in PCT/EP2020/062450 filed May 5, 2020, 2 pages.

(Continued)

*Primary Examiner* — Ted Kim
(74) *Attorney, Agent, or Firm* — Oblon, McClelland, Maier & Neustadt, L.L.P.

(57) ABSTRACT

A door for a thrust reverser of a propulsion assembly, the door being provided with a flexible baffle. The baffle is configured to change state by moving from a folded position to an unfolded position, and vice versa, depending on the configuration of the reverser. When the reverser is in reverse jet configuration, the door is open and the baffle is in an unfolded position in order to direct a flow of gas upstream of the propulsion assembly, thus generating a counter-thrust. When the reverser is in direct jet configuration, the door is closed and the baffle is in a folded position so as to cancel or minimise interference caused by the baffle in the flow of gas passing through the propulsion assembly and thus generating a thrust.

8 Claims, 5 Drawing Sheets

(56) References Cited

U.S. PATENT DOCUMENTS

| | | | |
|---|---|---|---|
| 3,393,885 A * | 7/1968 | Neumark | B64D 17/52 |
| | | | 244/152 |
| 4,894,985 A | 1/1990 | Dubois et al. | |
| 5,230,213 A | 7/1993 | Lawson | |
| 6,151,884 A | 11/2000 | Gonidec et al. | |
| 2011/0204161 A1 | 8/2011 | D'inca | |
| 2021/0207557 A1* | 7/2021 | Czapla | F02K 1/72 |

OTHER PUBLICATIONS

Preliminary French Search Report issued on Jan. 17, 2020 in French Patent Application No. 1905011 filed May 14, 2019, 2 pages (with Translation of Category).

* cited by examiner

DOOR FOR THRUST REVERSER OF AN AIRCRAFT PROPULSION ASSEMBLY, COMPRISING A FLEXIBLE BAFFLE

TECHNICAL FIELD

The present invention relates to the field of thrust reversers for an aircraft propulsion assembly, in particular reversers with doors. In general terms, the doors of a thrust reverser are designed to redirect, to the upstream side of the propulsion assembly, part of the thrust generated by a turbomachine such as a bypass turbojet engine, thus producing a counterthrust intended to reduce the braking distance of the aircraft when landing.

The present invention applies not only to reversers the doors of which are arranged downstream of the propulsion assembly, in order to redirect a mixture of the primary and secondary flows generated by the turbine engine, but also to reversers the doors of which are configured to redirect only the secondary flow.

More specifically, the present invention relates to a baffle of a reverser door, also referred to as a "spoiler" or "baffle spoiler", the function of which is to orient, to the upstream side of the propulsion assembly, the flow—mixed or secondary—redirected by the door.

PRIOR ART

A thrust reverser door is generally mounted so as to pivot between a closed position wherein it enables the propulsion assembly to generate a thrust, and an open position wherein it is disposed so as to redirect a gas flowing in the propulsion assembly in the direction of a radial opening of the reverser, so as to generate a counterthrust.

In the prior art, such a door is typically equipped with a baffle forming a rigid wall secured in line with one end of the internal face of the door in order to orient the flow towards the upstream side of the propulsion assembly.

A reverser door baffle is all the more effective in generating a counterthrust, the greater its size. However, the overall size thereof, and/or the arrangement thereof through the gas flow stream when the door is closed, impair the performance of the propulsion assembly in direct jet mode, i.e. when the aircraft must be propelled.

To overcome this drawback, equipping the reverser with a mechanism able to retract the baffle when the door is closed, for example a mechanism as described in the document FR 2 618 853 A1, is known.

The conventional retraction mechanisms require guidance and articulation means that are relatively complex, heavy and unreliable.

The present invention aims to overcome the drawbacks of the baffles of the prior art by procuring a reverser door provided with a baffle capable of providing good performance in thrust reversal while limiting pressure drops in direct jet mode.

In particular, one aim of the present invention is to procure a door having a baffle that satisfies criteria of reliability, simplicity and/or lightness.

DISCLOSURE OF THE INVENTION

For this purpose, the object of the invention is a door for a thrust reverser of an aircraft propulsion assembly, arranged to be mounted so as to pivot with respect to a fixed structure of said reverser between:

a closed position, enabling the propulsion assembly to generate a thrust, and an open position, wherein the door is able to redirect a gas flowing in the propulsion assembly in the direction of a radial opening of the reverser so as to generate a counterthrust.

This door comprises a baffle arranged to orient, towards the upstream side of the propulsion assembly, part of the gas redirected by this door when the latter is open, the baffle comprising a directing wall and at least two lateral walls connecting the directing wall to the door.

Typically, the baffle may comprise at least one first lateral wall arranged on a first circumferential end of the directing wall and a second lateral wall arranged on a second circumferential end of the directing wall, the second circumferential end of the directing wall being circumferentially opposite to the first end of this directing wall.

According to the invention, the directing wall and/or the lateral walls comprise a flexible material enabling the baffle to adopt:

an unfolded position when the door is open, wherein the directing wall is arranged opposite a flow of gas redirected by the open door so as to orient this flow towards the upstream side of the propulsion assembly, and a folded position when the door is closed, wherein the directing wall and the lateral walls of the baffle are closed onto an internal face of the door.

A baffle comprising a flexible material enables it in particular to unfold and fold successively during changes in position of the door, to fulfil the function of orientation of gas flow when the door is open, and to reduce the weight of the baffle compared with a conventional baffle made from composite material.

The flexibility of the baffle makes it possible to size it so as to optimally ensure the function of flow orientation in reversed jet, while limiting the pressure drops in direct jet. This is because folding the baffle typically makes it possible to house it in a small space located between:

the part of the door receiving the baffle, i.e. the part of the door to which the baffle is secured and against which it is closed (in the folded position), and the part of the fixed structure of the reverser facing the baffle when the door is closed.

Typically but non-limitatively, the part of the door receiving the baffle may be formed by one end of the internal face of the door situated furthest upstream of the propulsion assembly in relation to the other parts of this internal face. In general, this part of the door is the one that makes the greatest radial travel when the door changes position, with respect to the other parts of the door.

Non-limitatively, said part of the fixed structure facing the baffle when the door is closed may be formed by a radially external face of a diversion edge of this fixed structure.

The reduced size of the baffle in the folded position makes it possible to improve the performance of the propulsion assembly in direct jet mode, i.e. with the door closed, compared with a conventional baffle of identical size, all the more so when this baffle is not retractable. This is because, with a conventional baffle, it is often necessary to create a longitudinal slope in the door to make it possible to better supply the baffle in reversed jet mode. This slope, generally referred to as a "cavity", causes, in direct jet mode, significant pressure drops in the stream. The flexible baffle of the invention makes it possible to considerably reduce the size of such a cavity or even to omit it without impairing the thrust reversal performance.

The flexible material of the baffle may be a textile such as a fabric comprising, for example, organic fibres of the chlorofibre, fluorofibre, acrylic fibre, phenolic fibre, aramid fibre, polyvinyl alcohol, polyethylene, polypropylene, phenylene polysulfide, viscose, polyamide, polyester, polyether ether ketone (PEEK), polyetherimide, polyazole, etc. type, or inorganic fibres of the ceramic fibre type such as silicon carbide fibres, boron carbide fibres, ceramic fibres based on alumina, etc., or a combination of such fibres.

Such a material makes it possible to obtain the required structural strength, resistance to environmental parameters of the baffle such as the temperature and/or the fluids to which the baffle is exposed.

In one embodiment, the baffle may comprise a plurality of lateral walls forming, with the directing wall, cells that follow each other circumferentially, each cell being delimited by a part of the directing wall and by two of said lateral walls, these lateral walls being arranged to guide said gas flow towards the directing wall.

Such a structure with multiple cells can be assimilated to a membrane structure wherein the forces transit tangentially to the membrane. In general, for a given cell, if the part of the directing wall delimiting this cell is held by its circumferential ends, this part of the directing wall will adopt substantially under load a form of a spherical sector in the case of holding at one point per end, or cylindrical in the case of holding on a straight-line segment of each end. This form can be modified by adapting the shape of the cell. To create an obstacle along the top of the door and thus to form a baffle spoiler, it is possible according to this embodiment to juxtapose the cells circumferentially, i.e. in the direction of the span of the door.

Such a structure with multiple cells makes it possible to improve the performance of the baffle in reversed jet mode, i.e. with the door open, in particular in terms of guidance of the gas flow by limiting the dispersion of this flow, and in terms of stabilisation of the baffle thanks to the better distribution of the forces exerted on the directing wall by the flow of gas and better orientation of these forces in the material forming the baffle. Moreover, the presence of a plurality of circumferentially adjacent cells makes it possible to distribute these forces circumferentially over the entire directing wall, so that each part of the directing wall delimiting a given cell orients towards the upstream side of the propulsion assembly a respective part of the gas flow. The result is better stability and better efficacy of the baffle.

In addition, the invention makes it possible to fold the baffle without any retraction mechanism or at least without using a retraction mechanism as complex as the conventional retraction mechanisms. The invention thus makes it possible to simplify the reverser and to reduce its total weight while procuring a door and baffle that are reliable and efficient.

According to a first variant embodiment, the baffle can be configured to unfold under the action of the gas flow when the door passes from the closed position to the open position, and/or to fold under the action of a compression of the baffle between the door and the fixed structure of the reverser when the door passes from the open position to the closed position.

This first variant makes it possible to dispense with any retraction mechanism, and more generally any device controlling the position of the baffle, for folding and/or unfolding thereof.

According to a second variant embodiment, the door may comprise a device for controlling the position of the baffle, this control device being configured for folding the baffle when the door passes from the open position to the closed position and/or for unfolding the baffle when the door passes from the closed position to the open position.

In one embodiment of this second variant, the control device may comprise a transmission member integral with one of either the baffle or the fixed structure of the reverser, this transmission member being configured to be moved by the other one of either the baffle or the fixed structure of the reverser:

so as to exert a folding force on at least one of said lateral walls when the door passes from the open position to the closed position, this folding force tending to close this lateral wall onto the internal face of the door, causing a closing onto this internal face of the directing wall and of the other lateral walls, and/or so as to exert an unfolding force on at least one of said lateral walls when the door passes from the closed position to the open position, this unfolding force tending to modify the inclination of this lateral wall with respect to the internal face of the door, causing an unfolding of the baffle.

Such a control device does not require members that are as complex and heavy as a conventional retraction mechanism, in particular since the forces required for curving the baffle, because of its flexibility, are typically less than the forces required for retracting a conventional rigid baffle. Because of the flexibility of the baffle, it can typically prove to be sufficient to apply said folding or unfolding force solely to the lateral walls located at the flanks of the door or even on only one of these lateral walls.

Furthermore, such a control device may be used solely for assisting or initiating the folding of the baffle, this folding being able to be implemented partly under the action of the movement of the door by compressing the baffle between the door and the fixed structure of the reverser.

Likewise, such a control device may be used solely for assisting or initiating the unfolding of the baffle, this unfolding being able to be implemented partly under the action of the gas flow.

More generally, the first and the second variant embodiment described above may be combined. For example, the control device may be configured solely for providing the folding of the baffle, the unfolding thereof being in this case implemented under the action of the gas flow. Conversely, the control device may be configured solely for providing the unfolding of the baffle, the folding thereof being in this case implemented under the action of the movement of the door by compression of the baffle between the door and the fixed structure of the reverser.

In another embodiment, the control device may comprise a fascia, this fascia comprising a central part secured to the directing wall of the baffle and two ends secured to two external lateral walls from said at least two lateral walls of the baffle. In this embodiment, the fascia may be configured so that, when the door passes from the open position to the closed position, the central part of the fascia is crushed by the fixed structure of the reverser or by an element carried by the fixed structure of the reverser so as to exert a traction force on said ends of this fascia, this traction force tending to close said external lateral walls of the baffle onto the internal face of the door, causing a closure onto this internal face of the other lateral walls of the baffle. For example, when the door is of the type that can be actuated by a jack in order to pass from the open position to the closed position, said element carried by the fixed structure of the reverser may be this jack.

Such a fascia forms a simplified control device that can be completely fabricated with a textile.

The flexible material of the fascia 32 may be a textile such as a fabric comprising, for example, organic fibres of the chlorofibre, fluorofibre, acrylic fibre, phenolic fibre, aramid fibre, polyvinyl alcohol, polyethylene, polypropylene, phenylene polysulfide, viscose, polyamide, polyester, polyether ether ketone (PEEK), polyetherimide, polyazole, etc. type, or inorganic fibres of the ceramic fibre type such as silicon carbide fibres, boron carbide fibres, ceramic fibres based on alumina, etc., or a combination of such fibres.

The invention also relates to a thrust reverser for an aircraft propulsion assembly, comprising a fixed structure and at least one door as defined above, the at least one door being mounted so as to pivot with respect to the fixed structure between:
  a closed position, enabling the propulsion assembly to generate a thrust, and
  an open position, wherein the door is able to redirect a gas flowing in the propulsion assembly in the direction of a radial opening of the reverser so as to generate a counterthrust.

The invention also relates to an aircraft propulsion assembly, comprising such a thrust reverser.

Other advantages and features of the invention will emerge from reading the following detailed non-limitative description.

BRIEF DESCRIPTION OF THE DRAWINGS

The following detailed description refers to the accompanying drawings, on which.

DETAILED DESCRIPTION OF EMBODIMENTS

Figure 1:
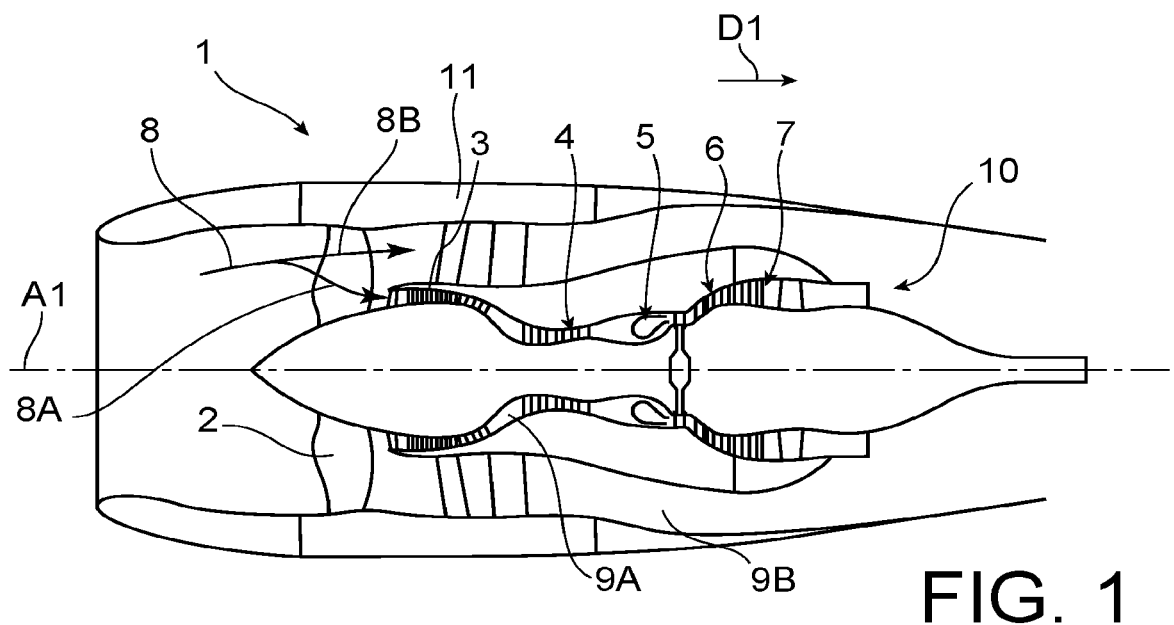
FIG. 1 is a schematic view in axial section of an aircraft propulsion assembly.

The invention relates to a propulsion unit 1 of an aircraft (not shown) as shown in FIG. 1. This propulsion assembly 1 comprises a bypass turbojet engine 10 streamlined by a nacelle 11.

The turbojet engine 10 has a longitudinal central axis A1 around which the various components thereof extend, in this case, from upstream to downstream of the turbojet engine 10, a fan 2, a low-pressure compressor 3, a high-pressure compressor 4, a combustion chamber 5, a high-pressure turbine 6 and a low-pressure turbine 7. The compressors 3 and 4, the combustion chamber 5 and the turbines 6 and 7 form a gas generator.

Hereinafter, the terms "upstream" and "downstream" are defined with respect to a main direction D1 of flow of air through the propulsion assembly 1 when the latter is being propelled.

Conventionally, when the turbojet engine 10 is operating, a flow of air 8 enters the propulsion assembly 1 through an air inlet upstream of the nacelle 11, passes through the fan 2 and then divides into a central primary flow 8A and a secondary flow 8B. The primary flow 8A flows in a main stream 9A for flow of the gases passing through the compressors 3 and 4, the combustion chamber 5 and the turbines 6 and 7. The secondary flow 8B for its part flows in a secondary stream 9B surrounding the gas generator of the turbojet engine 10 and delimited radially towards the outside by the nacelle 11.

Figure 2:
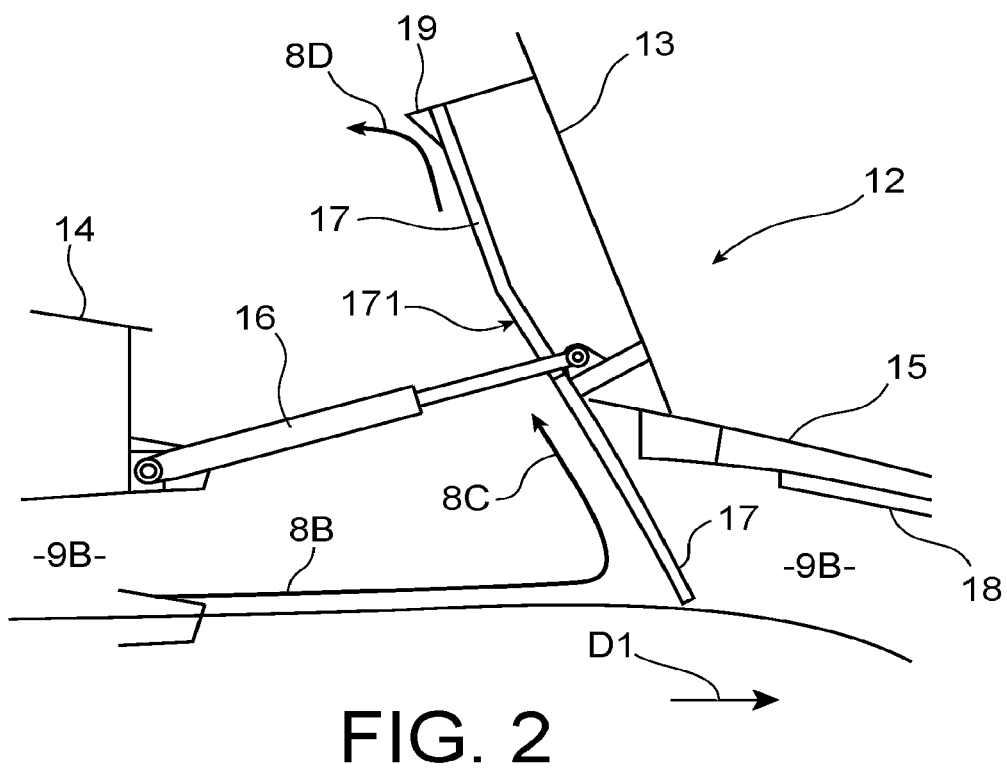
FIG. 2 is a schematic half-view in axial section of a thrust reverser with doors according to the invention, in a reversed-jet configuration.
Figure 3:
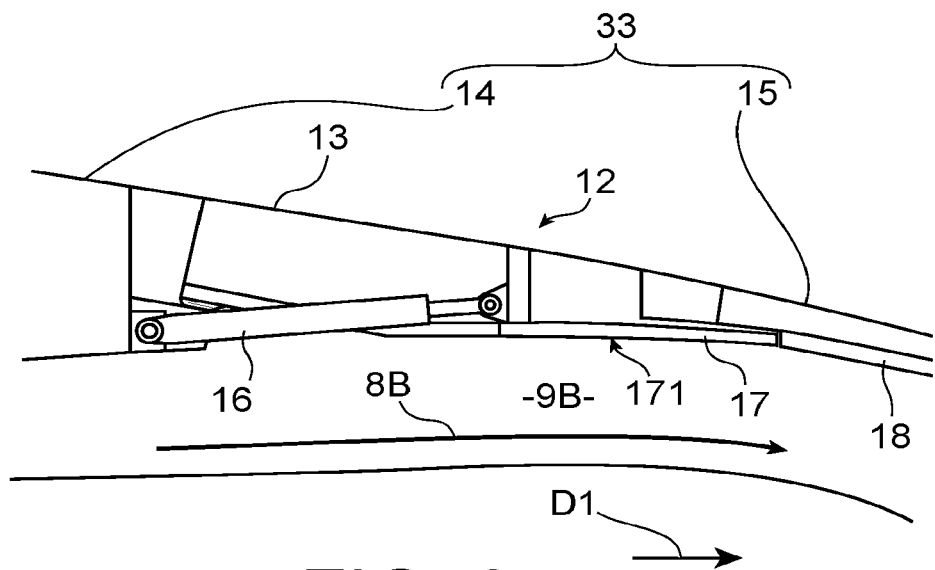
FIG. 3 is a schematic half-view in axial section of the thrust reverser with doors of FIG. 2, in a direct-jet configuration.

Although FIG. 1 does not show a thrust reverser, this propulsion assembly 1 can be equipped with a thrust reverser 12 as illustrated in FIGS. 2 and 3.

The thrust reverser 12, when the aircraft is landing, makes it possible to generate a counterthrust by redirecting all or part of the secondary flow 8B towards the upstream side of the propulsion assembly 1.

To do this, the thrust reverser 12 of FIGS. 2 and 3 comprises a door 13 mounted so as to pivot with respect to a fixed structure 33 of this reverser 12, this fixed structure 33 including in this example a front frame 14 and a downstream shell 15.

In a manner known per se, the front frame 14 typically belongs to an intermediate section of the nacelle 11 and the downstream shell 15 delimits an outlet portion of the secondary stream 9B.

In this example, the door 13 is mounted so as to pivot on the downstream shell 15 and can pivot under the action of a jack 16 connected firstly to the door 13 and secondly to the front frame 14.

When the reverser 12 is in a "direct jet" configuration, the door 13 is in the closed position illustrated in FIG. 3. In this configuration, the secondary stream 8B can pass through the secondary stream 9B from upstream to downstream so as to generate a thrust able to propel the aircraft.

The door 13 can be placed in the open position illustrated in FIG. 2 so as to place the reverser 12 in a "reversed jet" configuration.

The passage of the door 13 from the closed position to the open position is achieved by pivoting the door 13 with respect to the fixed structure 33 of the reverser 12 under the action of the jack 16.

When the reverser 12 is in the reversed-jet configuration, i.e. when the door 13 is open, at least a part 8C of the secondary flow 8B is redirected by the door 13 in the direction of a radial opening of the reverser 12.

This is because the pivoting of the door 13 on the downstream shell 15 when it opens leaves clear a radial opening between the door 13 and the front frame 14, and results in an arrangement of the door 13 wherein a part of an internal wall 17 of this door 13 extends through the secondary stream 9B, preventing all or most of the secondary stream 8B from continuing its path towards the outlet of the secondary stream 9B.

Because of the orientation of the door 13 in the open position, the gas thus blocked continues its path by passing through the radial opening and having at least one component directed towards the upstream side of the propulsion assembly 1, thus generating a counterthrust.

When the door 13 is closed (FIG. 3), this provides a structural continuity between the front frame 14 and the downstream shell 15 so that the internal wall 17 of this door 13 delimits the secondary stream 9B continuously with an internal wall 18 of the downstream shell 15.

In order to improve the performance of the reverser 12 in reversed jet mode, the door 13 is equipped with a baffle 19.

In general terms, the baffle 19 is arranged to orient, towards the upstream side of the propulsion assembly 1, the part 8C of the gas redirected by the open door 13. In the example in FIG. 2, the baffle 19 is secured in line with the internal wall 17 of the door 13, at an end of this internal wall 17 opposite to its end extending in the secondary stream 9B. The baffle 19 makes it possible to orient towards the upstream side of the propulsion assembly 1 the part 8C of the gas coming from the secondary stream 9B and flowing along the internal wall 17 of the door 13 (see arrow 8D in FIG. 2).

Figure 4:
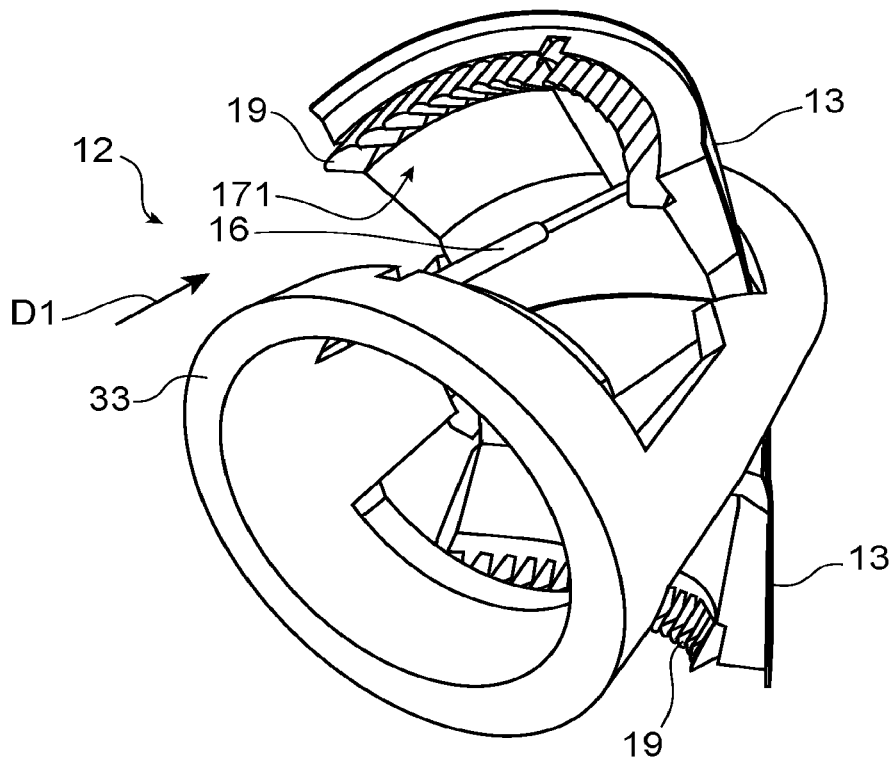
FIG. 4 is a schematic view in perspective of a clamshell thrust reverser according to the invention, in a reversed-jet configuration.
Figure 5:
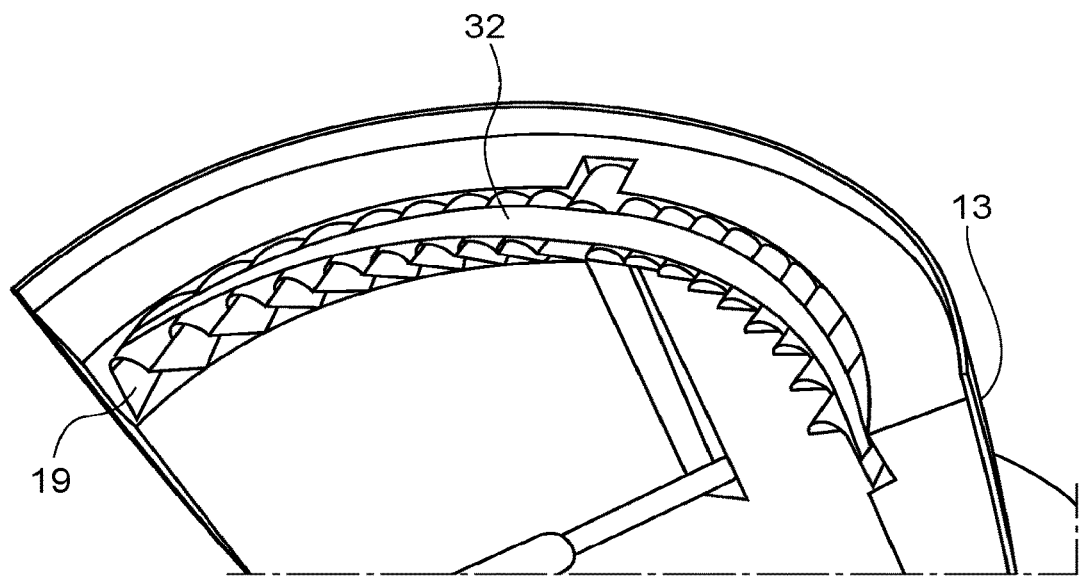
FIG. 5 is a schematic view in perspective of a door of a clamshell thrust reverser including a baffle according to the invention, this figure showing a device for folding the baffle by means of a flexible fascia.

The principle of the invention applies equally well to a reverser with doors designed to redirect, towards the upstream side of the propulsion assembly 1, only the secondary stream, as in the examples in FIGS. 1 and 3, and to a reverser with doors—also referred to as a clamshell reverser—designed to redirect, towards the upstream side of the propulsion assembly 1, both the primary stream and the secondary stream generated by the turbojet engine, as in the examples in FIGS. 4 and 5.

According to the invention, the baffle 19 comprises a flexible material such as a fabric including for example ceramic or aramid fibres, this fabric being able to be woven or serge.

Examples of baffles 19 according to the invention are described below with reference to FIGS. 4 to 10.

Figure 8:
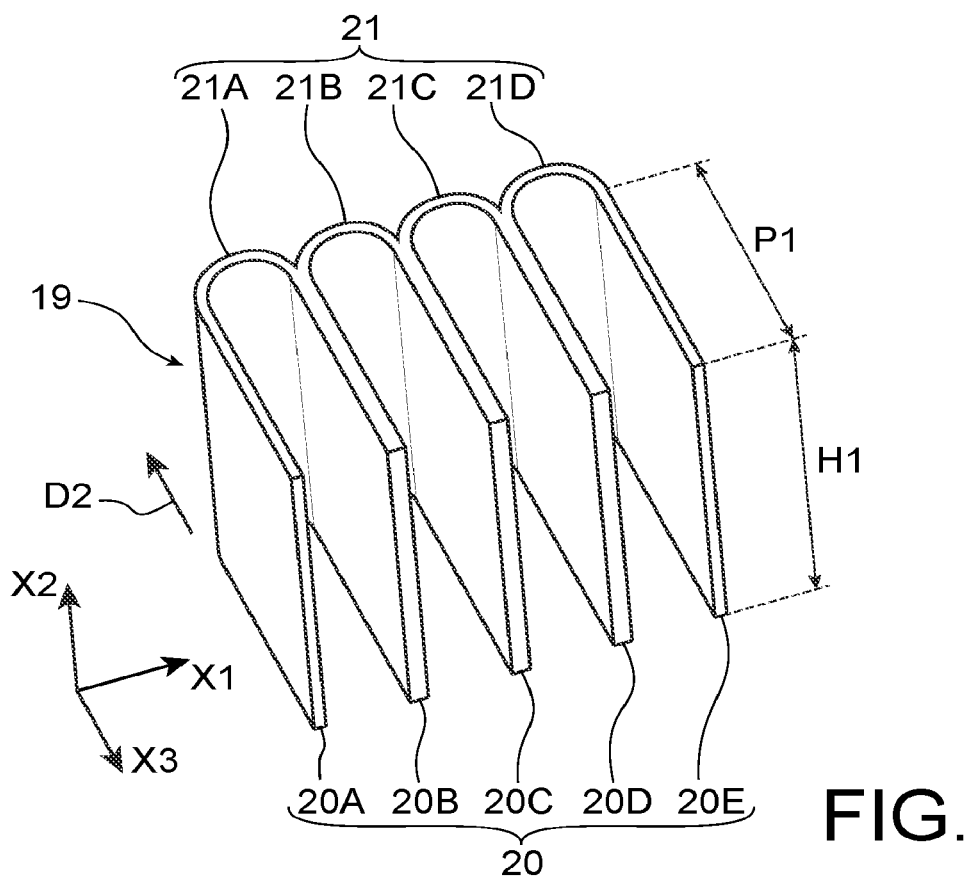
FIG. 8 is a schematic view in perspective of a multi-cell baffle for a thrust reverser door according to the invention, showing a directing wall of this baffle deformed by a gas flow.

In the example in FIG. 8, the baffle 19 comprises a plurality of lateral walls 20A-20E and a directing wall 21 forming cells.

In this example, each cell is delimited by two of the lateral walls 20A-20E and by a part 21A-21D of the directing wall 21. Going from left to right in FIG. 8, the baffle 19 comprises:
a first cell delimited by the lateral walls 20A and 20B and by a part 21A of the directing wall 21,
a second cell delimited by the lateral walls 20B and 20C and by a part 21B of the directing wall 21,
a third cell delimited by the lateral walls 20C and 20D and by a part 21C of the directing wall 21, and
a fourth cell delimited by the lateral walls 20D and 20E and by a part 21D of the directing wall 21.

The lateral walls 20A-20E of the baffle 19 of FIG. 8 are shown schematically with a substantially square form in the plane X2-X3. In order to optimise their stability under load, the lateral walls of the baffle 19 can have a substantially triangular form in the plane X2-X3 as illustrated in the examples in FIGS. 9 and 10, so that the height H1 of the lateral wall is zero at the entry of the cell and reaches its maximum value at the directing wall 21.

With reference to the reference frame X1-X2-X3 in FIG. 8, the lateral walls 20A-20E are spaced apart from each other along a direction X1, the directing wall 21 has a height H1 in a direction X2 and the cells have a depth P1 in a direction X3.

In this example, the directing wall 21 and the lateral walls 20A-20E of the baffle 19 are all produced from flexible material.

When the baffle 19 is secured to the door 13 of the reverser 12, the cells of the baffle 19 follow each other circumferentially around the axis A1 of the propulsion assembly 1. In other words, the direction X1, along which the lateral walls 20A-20E are spaced apart from each other, is a circumferential direction.

With reference to FIGS. 2 and 8, the baffle 19 is secured on the door 13 so that, when the door 13 is in the open position (reversed jet mode), at least part of the gas flow 8C redirected by the door 13 enters the cells of the baffle 19 in a flow direction D2.

The lateral walls 20A-20E are arranged to guide this part of the gas flow 8C towards the directing wall 21, or more precisely towards an internal face of the directing wall 21, located within the cells of the baffle 19.

Thus, when the door 13 is open and the baffle 19 is in the unfolded position, the directing wall 21 of the baffle 19 is arranged opposite the part of the gas flow 8C entering the cells of the baffle 19, the directing wall 21 thus orienting this part of the flow 8C towards the upstream end of the propulsion assembly 1.

On FIG. 8, the directing wall 21 of the baffle 19 is shown deformed by the flow of gas to which it is subjected during the operation of the propulsion assembly 1 in reversed jet mode. This deformation in no way prevents the baffle 19 from orienting the gas towards the upstream end of the propulsion assembly 1. On the one hand, the difference in pressure between the internal face of the directing wall 21 and the external face that is opposite thereto produces a tension of the baffle 19 that stabilises it. On the other hand, in the example in FIG. 8, each part 21A-21D of the directing wall 21 subjected to a gas flow in the direction D2 deforms in a substantially uniform manner over the entire height H1 of the directing wall 21, the lateral walls 20A-20E holding respective ends of each part 21A-21D of the directing wall 21 over the entire height H1 of this directing wall 21.

Figure 10:
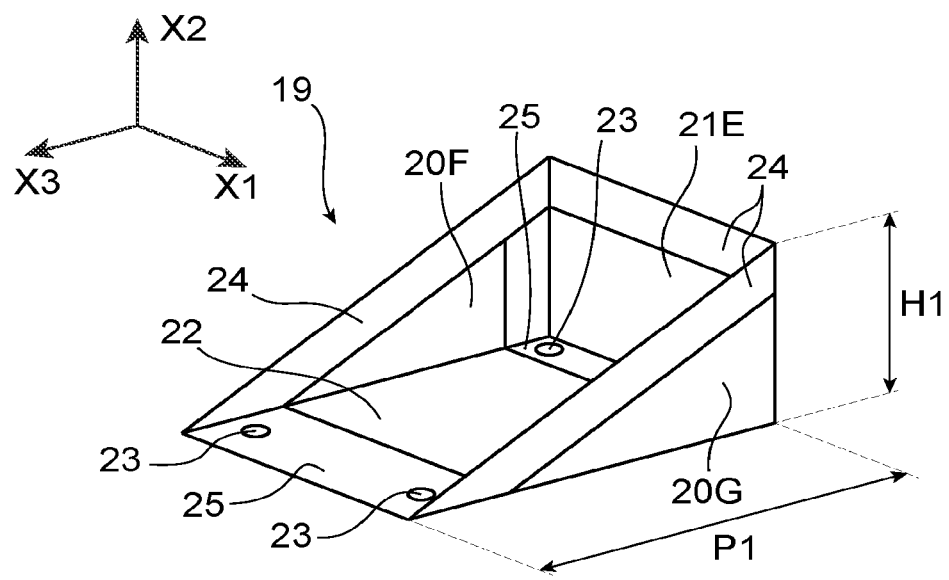
FIG. 10 is a schematic view in perspective of a cell of a thrust reverser door baffle according to the invention, comprising reinforcements and means for securing the baffle.

FIG. 10 shows an isolated cell of a baffle 19 according to another embodiment of the invention. This cell is delimited by two lateral walls 20F and 20G and by a part 21E of a directing wall of this baffle 19. In this example, the lateral walls 20F and 20G have a height H that is variable along the direction X3, in this case a zero height at the cell entry, a maximum height at the directing wall and a height increasing between the entrance of the cell and the directing wall.

FIG. 10 shows a support wall 22 of the baffle 19 intended to be positioned against an internal face 171 of the door 13, this internal face 171 being formed by said internal wall 17 of the door 13.

The baffle 19 can be secured to the door 13 by securing means 23 such as rivets passing through the support wall 22 of the baffle 19 (see FIG. 10).

In the example in FIG. 10, the baffle 19 furthermore comprises reinforcement elements. These reinforcement elements include firstly layers 24 of flexible material secured to the lateral walls 20F and 20G and to the part 21E of the directing wall along a peripheral part of these walls, i.e. along a free border of the baffle 19. These reinforcement elements moreover include layers 25 of flexible material secured to the support wall 22 so as to reinforce the parts of this support wall that receive the securing means 23.

Figure 9:
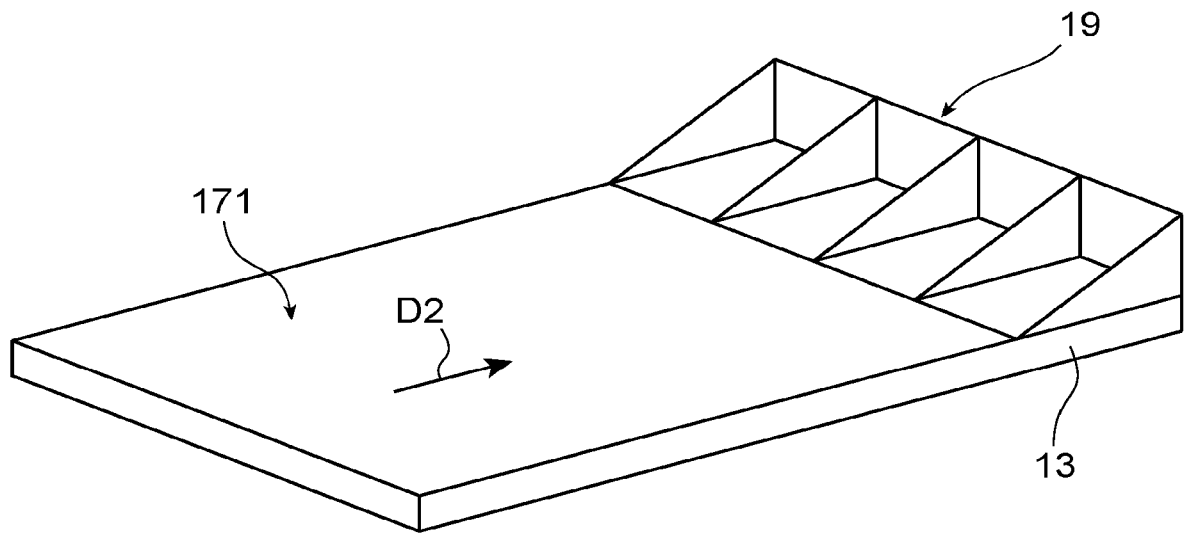
FIG. 9 is a schematic view in perspective of a thrust reverser door according to the invention, showing a multi-cell baffle in the unfolded position.

FIG. 9 shows a door 13 to which a baffle 19 forming four cells of the type illustrated in FIG. 10 is secured. This figure shows the baffle 19 non-loaded, which explains the angular shapes of the cells and the flatness of the directing wall.

When the baffle 19 is loaded, the various parts of the directing wall, referenced 21A to 21D in FIG. 8, tend to round as illustrated in FIGS. 4 to 6 and 8.

The baffle 19 in FIG. 9 can be produced in a single piece or be formed from a plurality of parts each forming a cell such as the one shown in FIG. 10.

More generally, the invention covers a baffle 19 comprising at a minimum a directing wall 21 and two lateral walls 20 forming a single cell, on the understanding that a door 13 of a reverser 12 can be equipped with only one single-cell baffle, with a plurality of single-cell baffles arranged so as to form together a multicell baffle, or a multicell baffle such as those given as an example in FIGS. 8 and 9.

With reference to the baffle in FIG. 8, neither a support wall nor means for securing this baffle 19 are shown in this figure. Naturally the baffle 19 in FIG. 8 may comprise a support wall, securing means and/or reinforcement elements similar to those of the baffle 10 in FIG. 10. Alternatively, the baffle 19 in FIG. 8 may be secured to the door 13 using any other means enabling it to fulfil its various functions, in particular the function of flow orientation.

A particularly advantageous function procured by the baffle 19 of the invention relates to its ability to change position or state when the reverser 12 passes from the direct-jet configuration to the reversed-jet configuration or from the reversed-jet configuration to the direct-jet configuration.

Figure 7:
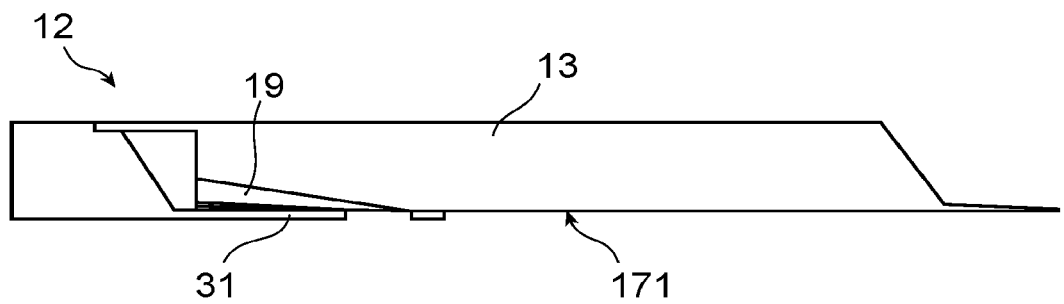
FIG. 7 is a schematic view in axial section of a thrust reverser according to the invention, in a direct-jet configuration.

More precisely, the flexible material of the baffle 19 enables it to adopt an unfolded position when the door 13 is open (FIGS. 4, 5 and 8 to 10) and a folded position when the door 13 is closed (FIG. 7).

FIG. 7 shows a door 13 in the closed position. In this example, the front frame 14 of the reverser 12 comprises a diversion edge 31 opposite the baffle 19 secured to the door 13 when the latter is in the closed position. This diversion edge 31 comprises a radially external face forming a reception face of the baffle 19.

In this example, the radially external face of the diversion edge 31 and the internal face 171 of the door 13 delimit between them a space the radial dimension of which is less than the height H1 of the directing wall 21 of the baffle 19 when this baffle 19 is in the unfolded position. When the door 13 is closed, the flexibility of the baffle 19 enables it to fold up within this small space by closing the directing wall 21 and the lateral walls of this baffle 19 onto the internal face 171 of the door 13.

In the example in FIG. 7, the part of the internal face 171 of the door 13 to which the baffle 19 is secured and against which it is closed has an inclination with respect to the part of the internal face 171 intended to delimit the secondary stream 9B. When the baffle 19 is in the unfolded position, such an inclination makes it possible to recompress the air at the foot of the baffle 19, which generates counterthrust and stabilises the baffle 19. In addition, such an inclination makes it possible to house the baffle 19 when the latter is in the folded position.

By comparison with a door 13 having a descending step forming a cavity in which the baffle 19 is housed (example in FIG. 6), such an inclination makes it possible to avoid a total pressure drop and a loss of recompression which impair the performance and stability of the baffle 19.

Other geometric arrangements can be envisaged. Thus, in the example in FIG. 9, these various parts of the internal face 171 are located in a common plane not having any discontinuity between them. This makes it possible to maximise the surface area of the baffle 19 actually contributing to orient the gas flow.

Figure 6:
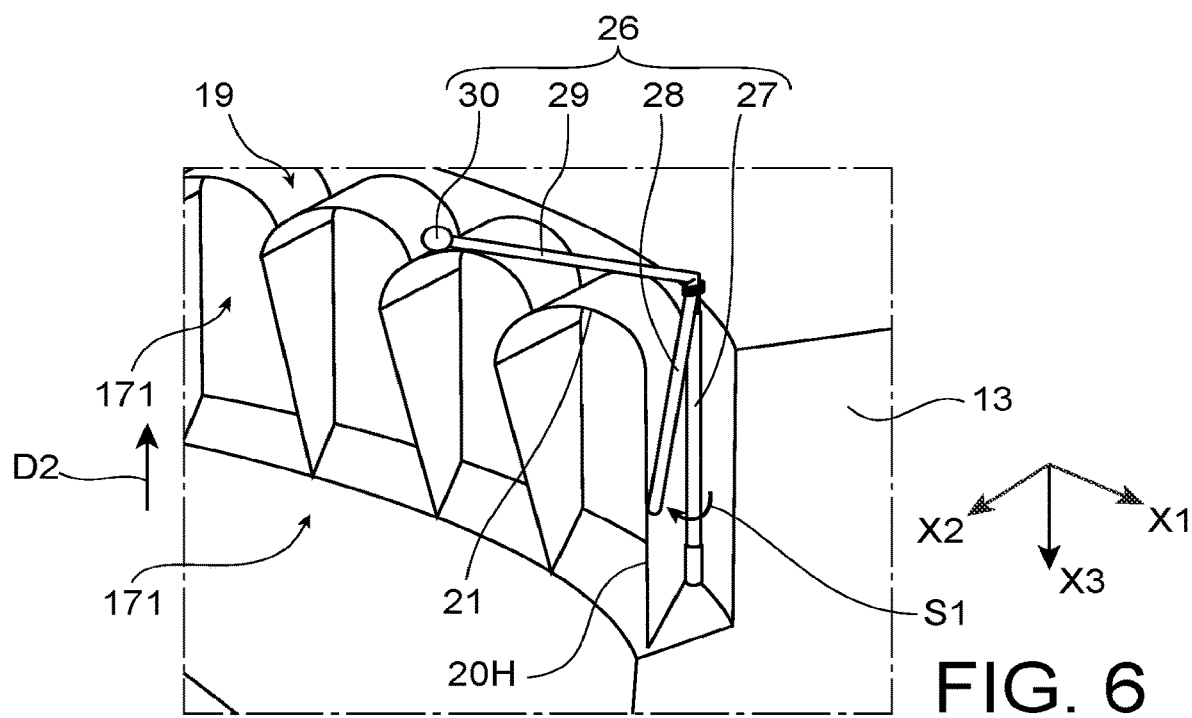
FIG. 6 is a partial schematic view in perspective of a door of a thrust reverser including a baffle according to the invention, this figure showing a device for controlling the position of the baffle.

Another type of arrangement consists in housing the baffle 19 in a cavity produced in the internal wall 17 of the door 13, as illustrated in FIGS. 4 to 6.

Still with reference to the embodiment in FIG. 7, the baffle 19 is in this example configured for unfolding autonomously when the door 13 passes from the closed position to the open position. This autonomous unfolding results from the structural properties inherent in the baffle 19, in particular the arrangement of its various walls 20 and 21, which exert on this baffle 19 forces tending to unfold it. In addition, when the door 13 opens, the baffle 19 is subjected to a gas flow that also contributes to unfolding thereof.

With reference to FIG. 6, an embodiment is presented wherein the door 13 is equipped with a control device configured for folding the baffle 19 when the door passes from the open position to the closed position.

This control device comprises a transmission member 26 forming a triple transmission arm.

A first part 27 of this transmission member 26 is connected to the door 13 in a pivot connection so as to allow a rotation of the transmission member 26 about a folding axis substantially parallel to the direction of the gas flow entering the cells of the baffle 19.

A second part 28 of the transmission member 26, integral with the first part 27, extends along a lateral wall 20H arranged at a circumferential end of the directing wall 21 of the baffle 19, in a direction that may be either oblique or substantially perpendicular to the internal face 171 of the door 13. In the example in FIG. 6, this direction is oblique.

A third part 29 of the transmission member 26, also integral with the first part 27, is surmounted by a gaiter 30. This third part 29 is arranged so that the gaiter 30 comes into contact with a part of the fixed structure of the reverser 12 when the door 13 passes from the open position to the closed position, so as to rotate the transmission member 26 about said folding axis, in a folding direction S1.

During such a rotation of the transmission member 26, the second part 28 of the transmission arm 26 exerts a bending force on the lateral wall 20H that tends to close this lateral wall 20H onto the internal face 171 of the door 13, causing in cascade a closing onto this internal face 171 of the other lateral walls and of the directing wall 21 of the baffle 19.

When the system is not loaded and the baffle 19 is in the unfolded position, the directing wall 21 is substantially perpendicular to the lateral wall 20H. Under these conditions, it is advantageous to position the transmission arm 28 on the lateral wall 20H along the mid-perpendicular between on the one hand the line of connection of the lateral wall 20H to the door 13 and on the other hand the junction line between the directing wall 21 and the lateral wall 20H. In other words, it is advantageous to position the transmission arm 28 so that the latter forms an angle of approximately 45° in relation to the internal face 171 of the door 13. When the transmission arm 28 drives the lateral wall 20H against the internal face 171 of the door 13 from the unfolded position to the folded position, such an orientation of this arm 28 makes it possible to superimpose in an optimum manner the lateral wall 20H and the directing wall 21 on each other, which makes it possible to reduce the overall size of the baffle 19 in the folded position and to minimise crumpling thereof.

In an embodiment that is not shown, the transmission member 26 may comprise a return mechanism tending to rotate the transmission member 26 about said folding axis, in an unfolding direction opposite to the folding direction S1, when the door passes from the closed position to the open position, i.e. when the contact between the fixed structure 33 of the reverser 12 and the gaiter 30 is released. More precisely, such a return mechanism can be arranged so that, during such a rotation of the transmission member 26, the second part 28 of the transmission arm 26 exerts an unfolding force on the lateral wall 20H. To do this, the second part 28 of the transmission arm 26 may typically comprise a part extending inside the cell delimited by the lateral wall 20H and/or may be secured to this lateral wall 20H. Such an unfolding force tends to modify the inclination of this lateral wall 20H with respect to the internal face 171 of the door 13, causing in cascade an unfolding of the other lateral walls and of the directing wall 21 of the baffle 19. To favour such a driving in cascade, the flexible baffle 19 may be fabricated so as to store a memory of its unfolded state tending to return the baffle 19 into this state.

In the embodiment in FIG. 5, the baffle 19 may comprise a fascia 32 of flexible material covering its directing wall 21. This fascia 32 may be secured to the external face of the directing wall 21.

By way of non-limitative example, the fascia 32 may comprise a flexible material such as a fabric including for example ceramic or aramid fibres, this fabric being able to be woven or serge.

Such a fascia 32 may be used to reinforce the directing wall 21 and to improve even further the performance of the reverser 12.

In this example, the fascia 32 forms a device for controlling the position of the baffle 19. For this purpose, the fascia 32 is configured for folding the baffle 19 when the door 13 passes from the open position to the closed position.

With reference to FIG. 5, the fascia 32 is secured to the directing wall 21 and to two external lateral walls 20 of the baffle 19, these two external lateral walls corresponding, in the illustration in FIG. 8, to the lateral walls 20A and 20E.

Such a fascia 32 assisting folding is particularly advantageous on a clamshell reverser as illustrated in FIG. 4, wherein the doors 13 are closed by a respective jack 16. Typically, for each door 13, the jack 16 extends centrally along the internal face 171 of the door 13 when the latter is in the closed position, so that the closure of the door 13 results in a pressing of the jack 16 against a central part of the directing wall 21 of the baffle 19. The fascia 32, interposed between the directing wall 21 of the baffle 19 and the jack 16, is thus deformed so that the ends thereof are consequently subjected to a traction force causing a closure onto the internal face 171 of the door 13 of said external lateral walls 20 of the baffle 19 and consequently of the other lateral walls of the baffle 19.

Such a fascia 32 forms a device for folding the baffle 19 that is at the same time lightweight, robust and easy to implement.

In an embodiment that is not shown, the control device may comprise both a fascia 32 as illustrated in FIG. 5 and a transmission member 26 as illustrated in FIG. 6.

FIG. 4 shows a thrust reverser 12 in the reversed-jet configuration, having two doors 13 each equipped with a baffle 19 according to the invention.

The invention is not limited to the embodiments that have just been described. For example, only a part of the directing wall 21 and/or of the lateral walls 20 may be produced from a flexible material as defined above, another part of these walls 20 and/or 21 being able to comprise another material, provided that the baffle 19 can be successively folded and unfolded during changes in position of the door 13. For another example, the cells of the baffle 19 may be levelled to form a smooth curved directing wall 21 (e.g. FIG. 4), or remain non-levelled, thus forming a stepped directing wall 21 (not shown).

The invention claimed is:

1. A door for a thrust reverser of an aircraft propulsion assembly, said door being arranged to be mounted pivotably with respect to a fixed structure of the reverser, the fixed structure including a front frame and a downstream shell of said reverser, the door is configured to pivot between:
   a closed position enabling the propulsion assembly to generate a thrust, the closed position of the door providing structural continuity between the front frame and the downstream shell such that an internal wall of the door delimits an air flow path continuously with an internal wall of the downstream shell, and
   an open position, wherein the door is able to redirect a gas flowing in the propulsion assembly in a direction of a radial opening of the reverser so as to generate a counterthrust, the door comprising:
   a baffle arranged to orient, towards an upstream side of the propulsion assembly, a part of the gas redirected by said door when the latter is open, the baffle including a directing wall and at least two lateral walls connecting the directing wall to the door,
   wherein the directing wall and/or the lateral walls comprise a flexible material enabling the baffle to adopt:
   an unfolded position when the door is open, wherein the directing wall is arranged opposite a flow of said gas redirected by the open door so as to orient said flow towards the upstream side of the propulsion assembly, and
   a folded position when the door is closed, wherein the directing wall and the lateral walls of the baffle are closed onto an internal face of the door.

2. The door according to claim 1, wherein the flexible material of the baffle is a textile.

3. The door according to claim 1, wherein the baffle comprises a plurality of lateral walls forming, with the directing wall, cells that follow each other circumferentially, each cell being delimited by a part of the directing wall and by two of said lateral walls, these lateral walls being arranged to guide said gas flow towards the directing wall.

4. The door according to claim 1, comprising a device for controlling the position of the baffle configured to fold the baffle when the door passes from the open position to the closed position and/or to unfold the baffle when the door passes from the closed position to the open position.

5. The door according to claim 4, wherein the control device comprises a transmission member integral with one of either the baffle or the fixed structure of the reverser, said transmission member being configured to be moved by the other one of either the baffle or the fixed structure of the reverser:
   so as to exert a folding force on at least one of said lateral walls when the door passes from the open position to the closed position, said folding force tending to close said lateral wall onto the internal face of the door, causing a closing onto said internal face of the directing wall and of the other lateral walls, and/or
   so as to exert an unfolding force on at least one of said lateral walls when the door passes from the closed position to the open position, said unfolding force tending to modify the inclination of said lateral wall with respect to the internal face of the door, causing an unfolding of the baffle.

6. The door according to claim 4, wherein the control device comprises a fascia, said fascia comprising a central part secured to the directing wall of the baffle and two ends secured to two external lateral walls from said at least two lateral walls of the baffle, said fascia being configured so that, when the door passes from the open position to the closed position, the central part of the fascia is crushed by the fixed structure of the reverser or by an element carried by the fixed structure of the reverser so as to exert a traction force on said ends of said fascia, said traction force tending to close said external lateral walls of the baffle onto the internal face of the door, causing a closure onto said internal face of the other lateral walls of the baffle.

7. A thrust reverser for an aircraft propulsion assembly, comprising the fixed structure and at least one door according to claim 1, the at least one door being mounted pivotably with respect to the fixed structure between:

the closed position enabling the propulsion assembly to generate a thrust, and the open position, wherein the at least one door is able to redirect a gas flowing in the propulsion assembly in the direction of the radial opening of the reverser so as to generate the counterthrust.

8. An aircraft propulsion assembly, comprising the thrust reverser according to claim 7.

* * * * *